United States Patent [19]
Okamoto et al.

[11] Patent Number: 5,534,362
[45] Date of Patent: Jul. 9, 1996

[54] FUEL CELL STACK AND METHOD OF PRESSING TOGETHER THE SAME

[75] Inventors: Takafumi Okamoto; Manabu Tanaka; Ichiro Baba; Hideo Kato; Norimasa Kawagoe, all of Wako, Japan

[73] Assignee: Honda Giken Kogyo Kabushiki Kaisha, Tokyo, Japan

[21] Appl. No.: 419,417

[22] Filed: Apr. 10, 1995

Related U.S. Application Data

[63] Continuation of Ser. No. 78,788, Jun. 17, 1993, Pat. No. 5,419,980.

[30] Foreign Application Priority Data

Jun. 18, 1992  [JP]  Japan .................................. 4-182860
Jul. 13, 1992  [JP]  Japan .................................. 4-206977

[51] Int. Cl.$^6$ .................................................. H01M 8/04
[52] U.S. Cl. .................. 429/32; 429/33; 429/35; 429/37; 29/623.2
[58] Field of Search .................. 429/32, 33, 35–39; 29/623.2; 204/256, 258

[56] References Cited

U.S. PATENT DOCUMENTS

| | | | |
|---|---|---|---|
| 4,560,626 | 12/1985 | Joy ........................................ | 429/66 X |
| 4,826,742 | 5/1989 | Reiser ..................................... | 429/33 |
| 5,185,220 | 2/1993 | Schora .................................... | 429/37 X |
| 5,262,249 | 11/1993 | Beal et al. ............................. | 429/33 X |

FOREIGN PATENT DOCUMENTS 55-119343  9/1980  Japan .
290432  8/1953  Switzerland .

*Primary Examiner*—Stephen Kalafut
*Attorney, Agent, or Firm*—Lyon & Lyon

[57] ABSTRACT

A fuel cell stack having unit cells and separators, in which each unit cell comprises a solid polymer electrolyte membrane having a pair of electrode catalysts attached on both surfaces, and a pair of collectors, each made of a rigid body, being in contact with respective electrode catalysts, and each of the separators comprises a pair of pressure generating plates defining therebetween a pressure chamber to which a pressurized fluid is introduced, the pressure generating plates being deformed by the pressurized fluid and pressed against the adjacent respective collectors.

28 Claims, 12 Drawing Sheets

FUEL CELL STACK AND METHOD OF PRESSING TOGETHER THE SAME

This is a continuation of Ser. No. 08/078,788, filed Jun. 17, 1993, now U.S. Pat. No. 5,419,980.

BACKGROUND OF THE INVENTION

1. Field of the Invention

This invention relates to a fuel cell stack and a method of pressing its elements together, wherein the fuel cell stack includes a plurality of fuel cell separators, each disposed between fuel cells and having a space therein into which a pressurized fluid is supplied to apply the pressure developed by an internal pressure of the space to the neighboring fuel cells.

2. Description of the Related Art

Developments in fuel cells ("FC"s) are remarkable today. An FC generates electric power from a reaction gas. FIG. 1 shows an internal manifold type FC as an example of conventional FCs. The structure of this type FC will be described hereafter.

An FC stack ("S") is constructed by stacking a number of unit fuel cells ("TC"s) on one another and mounting end plates ("EP"s) to both ends of the stack of the TCs. The TC has a power generating unit ("H") and a pair of holding units ("K"s) disposed on both sides of the H. The H comprises an electrolyte layer and a pair of catalytic electrodes ("CA"s) attached on both sides of the electrolyte layer. A pair of collectors ("CO"s) are positioned between the H in the center of the TC and the Ks on both sides of the H.

Then, the EPs are pressed together by compression means such as bolts B with coil springs C. That is, the conventional method of pressing the FC stack together has been such that the H and the Ks of each TC are simultaneously clamped by compression means such as the bolts B.

In the above S, one of the EPs acts as a pressure generating member ("MH"), in which a recess ("HB"), covered with a membrane ("L"), is defined and a balloon is provided in the HB so as to be inflated to fill the HB. Then, $H_2$ or $O_2$ as a reaction gas ("G") for the FC is introduced into the MH through a supply line ("KP") connected to the MH through the EP, and inflates the balloon in the MH. As a result, the L is flexed and pressed against the neighboring TC, applying a compression force thereto.

Stacking the TC on one another while applying a pressure to each TC, as described above, enables the FC to avoid variation in contact resistance between the electrode catalysts and collectors, between the H and Ks, and between the TCs, to assure a constant output voltage therefrom.

There have been, however, problems in the conventional method of stacking FC, as follows.

(A) In the method of stacking the FC as shown in FIG. 1, a recess is defined on an inner surface of the K in which respective one of the CAs and COs are held. It is therefore necessary to accurately match the depth of the recess of respective Ks with the thicknesses of the CA and CO. That is, each TC must be fabricated with high accuracy.

(B) In the above method of stacking the FC, the compression bolts B have twofold tasks: one is to seal passages for reaction gas internally defined in the respective members by pressing the respective members against each other, and the other is to press the CAs and COs in respective TCs. However, required pressure for sealing the passages and pressing the CAs and COs are generally different, because the purpose and use of them are different from each other. Therefore, when the bolts B are tightened under a suitable pressure to press the CAs and COs, there is a danger of inappropriate sealing of the passages, and vise versa.

(C) In the conventional method described above, the compression force is applied on both ends or only one end of the stack S to press the constitutive members. Thus, as the number of the TC to be stacked increases, the number of members having force relaxing nature (such as sealing members) also increases. As a result, the compression force applied to the S is not sufficiently transferred to each of the TCs, due to partly deformation of respective members, causing insufficient pressing together of the TCs.

In order to overcome the inconvenience raised in (C), it has been necessary to adopt either one of applying a larger force to press together the constitutive members, or restricting the number of the TCs in one stack S. However, when the former is selected, the use of fragile materials such as carbon, plastic, ceramic, etc. in each TC must be restricted.

When the latter is selected, it is necessary to series-connect several Ss each having a restricted number of TCs therein to obtain a desired voltage. This makes piping for the reaction gas, or arrangement of auxiliary instruments, etc. complex, and increases the space to be occupied by the FC. Further, an integrated control of the series-connected Ss is not necessarily easy.

(D) In the conventional FC, it has often been seen that one cooling plate is placed for a series of several TCs in one S. In this structure, the temperature of a series of TCs placed between a pair of cooling plates is maintained constant, but that constant temperature may be different from the temperatures of other series of TCs. This temperature difference can cause an insufficient cooling of the TCs in an operation at a high current density.

In addition to the above, a method of compressing the S has been proposed by U.S. Pat. No. 4,317,864. In this method, contact members are placed between respective TCs constituting an S, each contact member having a chamber defined therein. A pressurized fluid to be fed to the TCs is introduced into the chambers so that the contact members are expanded to press the CAs. Thus, the COs are brought into close contact with their corresponding CAs. Therefore, if the contact members are provided for every TCs, a pressure different from the pressure used for sealing the fluid passages can be applied to each CA. In stacking a plurality of TCs on one another, a uniform pressure can be applied to the respective TCs.

However, since the COs employed in each TC are thin, it is difficult to apply a uniform pressure to the COs through the expanding contact members. Further, the pressure applied to each CO is low, because the pressure of the pressurized fluid has been exhausted in expanding each contact member. That is, the efficiency in transferring pressure is poor. As a result, the contact resistance between the CAs and COs cannot be lowered sufficiently and a desired output voltage cannot be attained.

SUMMARY OF THE INVENTION

The present invention has been made to overcome the foregoing problems. The object of the present invention is, accordingly, to provide a fuel cell stack and a method of squeezing it together, wherein pressure for squeezing the fuel cell stack together is simultaneously produced in each unit cell by a pressurized fluid when each unit cell is activated by the fluid.

According to one aspect of the present invention, for achieving the above object, there is provided a fuel cell stack comprising a plurality of unit cells for taking out electrical energy from a reaction gas and a plurality of separators interposed between said unit cells, wherein each of said unit cells comprises a solid polymer electrolyte membrane having a pair of electrode catalysts attached on both surfaces thereof, and a pair of collectors, each made of a rigid body, being in contact with respective said electrode catalysts, and each of said separators comprises a pair of pressure generating plates defining therebetween a pressure chamber into which a pressurized fluid is introduced, said pressure generating plates being deformed by the pressurized fluid and pressed against adjacent respective said collectors.

In the fuel cell stack of the present invention constructed as described above, the pressurized fluid is introduced into the pressure chamber formed in each separator and the pressure forcing the elements of the fuel cell stack together is applied on each of the collectors by the adjacent pressure generating plate. As a result, the collectors are slightly displaced so as to compress each of the solid polymer electrolyte membranes therebetween. Since each of the collectors is made of the rigid body and the solid polymer electrolyte membranes are held by the corresponding collectors, the solid polymer electrolyte membranes are uniformly pressed by the collectors and the contact resistance between each of the collectors and the solid polymer electrolyte membrane is reduced.

According to another aspect of the present invention, there is provided a method of pressing together the unit cells of a fuel cell stack which comprises a plurality of unit cells for taking out electrical energy from a reaction gas and separators interposed between respective unit cells, comprising the steps of introducing a pressurized fluid into a pressure chamber formed in each of said separators; transferring a pressure in the pressure chamber due to the pressurized fluid to each of the collectors in the neighboring unit cells through pressure generating plates provided in respective separators; and pressing each of the collectors against each of the electrode catalysts respectively disposed on both sides of a solid polymer electrolyte membrane of the unit cell by displacement of the pressure generating plates.

According to the method of pressing together the unit cells of the fuel cell stack referred to above, since the collectors, each being a rigid body, are uniformly pressed against the solid polymer electrolyte membranes of the unit cells, a low contact resistance between the collectors and the solid polymer electrolyte membranes is attained.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

The present invention will be described in detail with reference to the accompanying drawings in which preferred embodiments are shown by way of illustrative example.

A description will first be made of the structure of a fuel cell stack according to the present invention.

Figure 3:
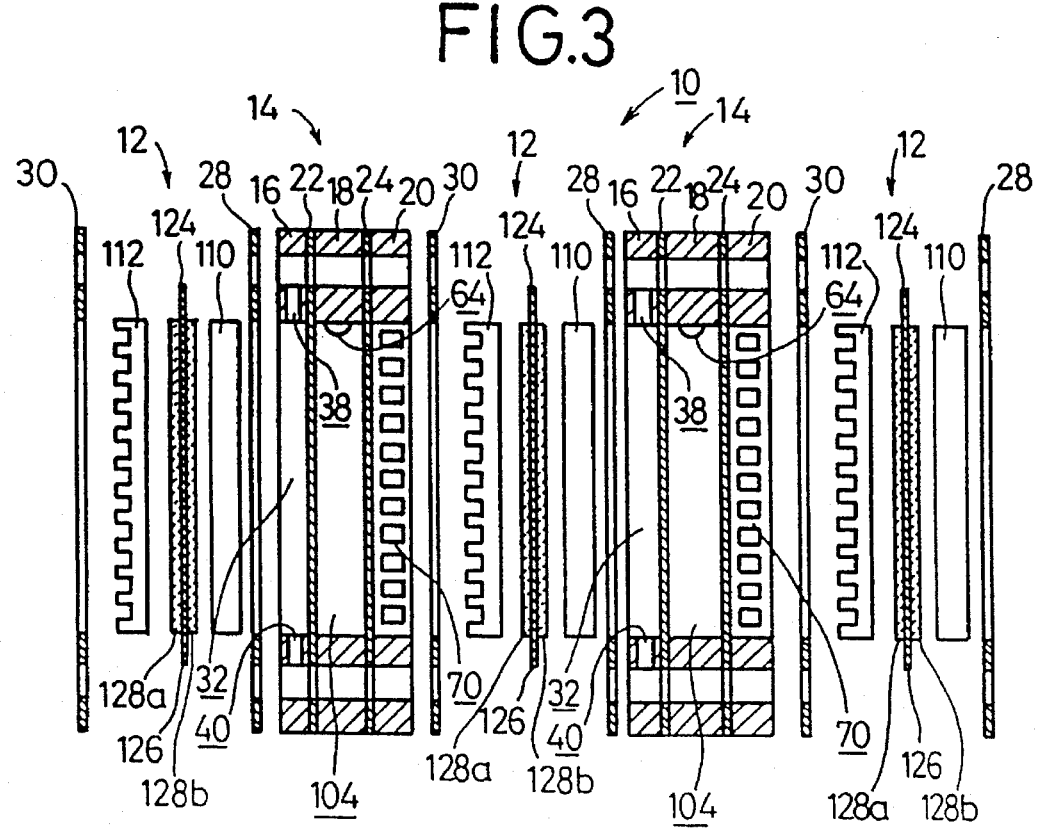
FIG. 3 is a partially exploded vertical cross-sectional view showing a fuel cell stack as an embodiment of the present invention.
Figure 4:
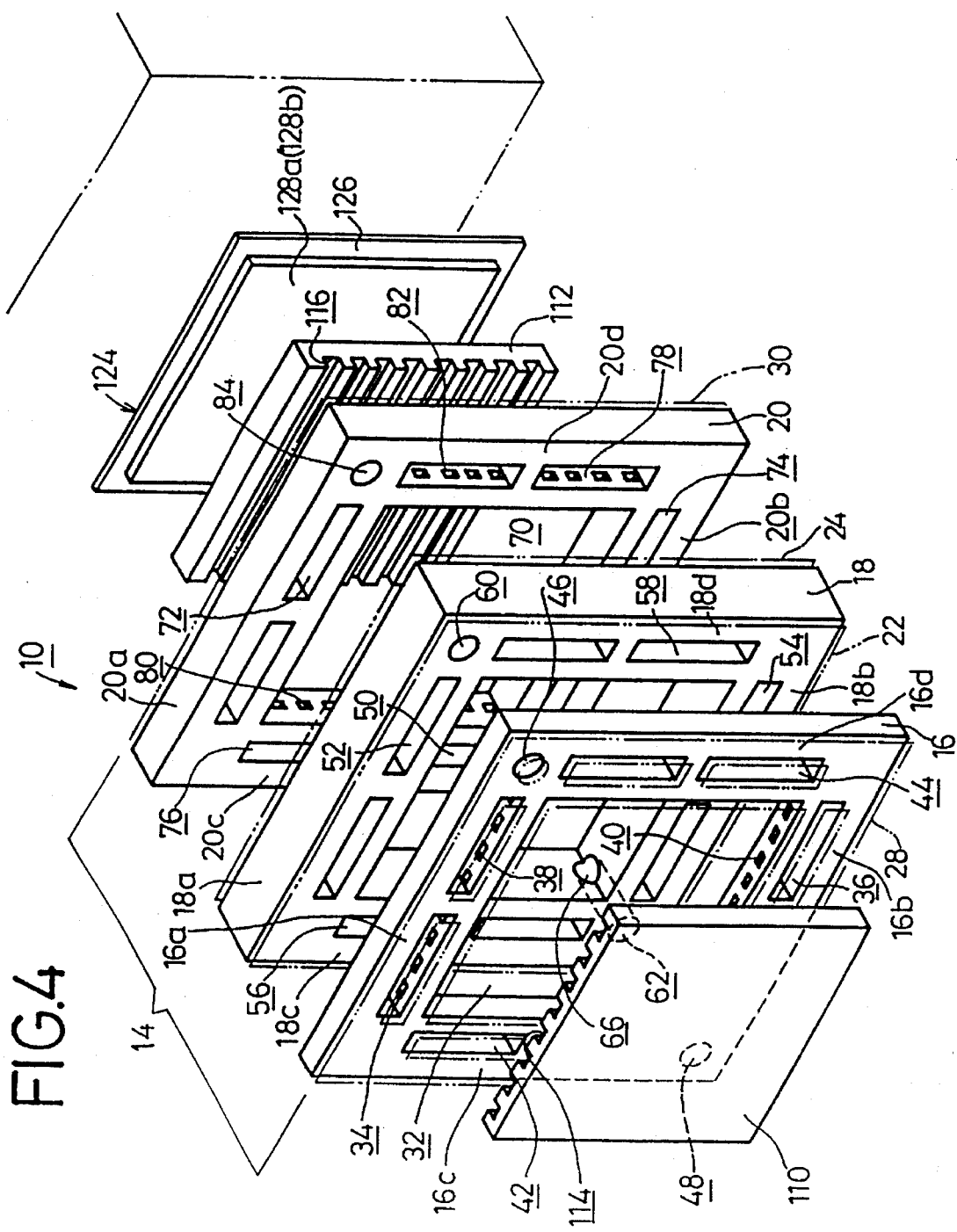
FIG. 4 is a partially exploded perspective view illustrating a part of the fuel cell stack shown in FIG. 3.

Referring to FIGS. 3 and 4, the fuel cell stack 10 basically comprises a plurality of cell units 12 and a plurality of holding units (hereinafter called "separators") 14. Each of the separators 14 has a first plate 16, a second plate 18 and a third plate 20 all of which are relatively thick. A first pressure generating plate 22 is interposed between the first plate 16 and the second plate 18. On the other hand, a second pressure generating plate 24 is interposed between the second plate 18 and the third plate 20. The first plate 16, the first pressure generating plate 22, the second plate 18, the second pressure generating plate 24, the third plate 20 are stacked on one another in that order to form a separator. Incidentally, reference numerals 28 in the drawings indicate first gaskets each mounted on one surface of the first plate 16. Further, reference numerals 30 indicate second gaskets each mounted on one surface of the third plate 20.

A description will now be made of the first plate 16. As is understood from FIGS. 3 and 4, a large opening or hole 32 shaped substantially in the form of a square is centrally defined in the first plate 16. A pair of through-holes 34 each shaped in the form of a rectangle and a similar pair of through-holes 36 are respectively defined in upper and lower frames 16a and 16b of the first plate 16 so as to surround the large hole 32. Each of the through-holes 34 communicates with the large hole 32 through a plurality of pores 38. On the other hand, each of the through-holes 36 communicates with the large hole 32 through a plurality of pores 40 in the same manner as described above.

A pair of through-holes 42, which are similar to the through-holes 34, 36 and extend in the vertical direction as viewed in FIGS. 3 and 4, are defined in a side frame 16c of the first plate 16, whereas a pair of through-holes 44 similar to the through-holes 42 are also defined in a side frame 16d of the first plate 16. A communication hole 46 and a communication hole 48 are respectively defined in the corner formed by the upper frame 16a and the side frame 16d of the first plate 16 and the corner formed by the lower frame 16b and the side frame 16c.

The second plate 18 will now be described below. A large opening or hole 50 similar to the large hole 32 of the first plate 16 is centrally defined in the second plate 18. Further, through holes 52 are defined in an upper frame 18a of the second plate 18 and through-holes 54 are defined in a lower frame 18b thereof. On the other hand, through-holes 56 and through-holes 58 are respectively defined in side frames 18c and 18d of the second plate 18. A communication hole 60 is defined in the corner formed by the upper frame 18a and the side frame 18d, whereas a communication hole 62 is defined in the corner formed by the lower frame 18b and the side frame 18c. The communication holes 60 and 62 communicate with each other through the large hole 50 and holes 64 and 66 (see FIG. 2). Incidentally, the second plate 18 is not provided with pores corresponding to the pores 38 and 40 defined in the first plate 16.

Figure 1:
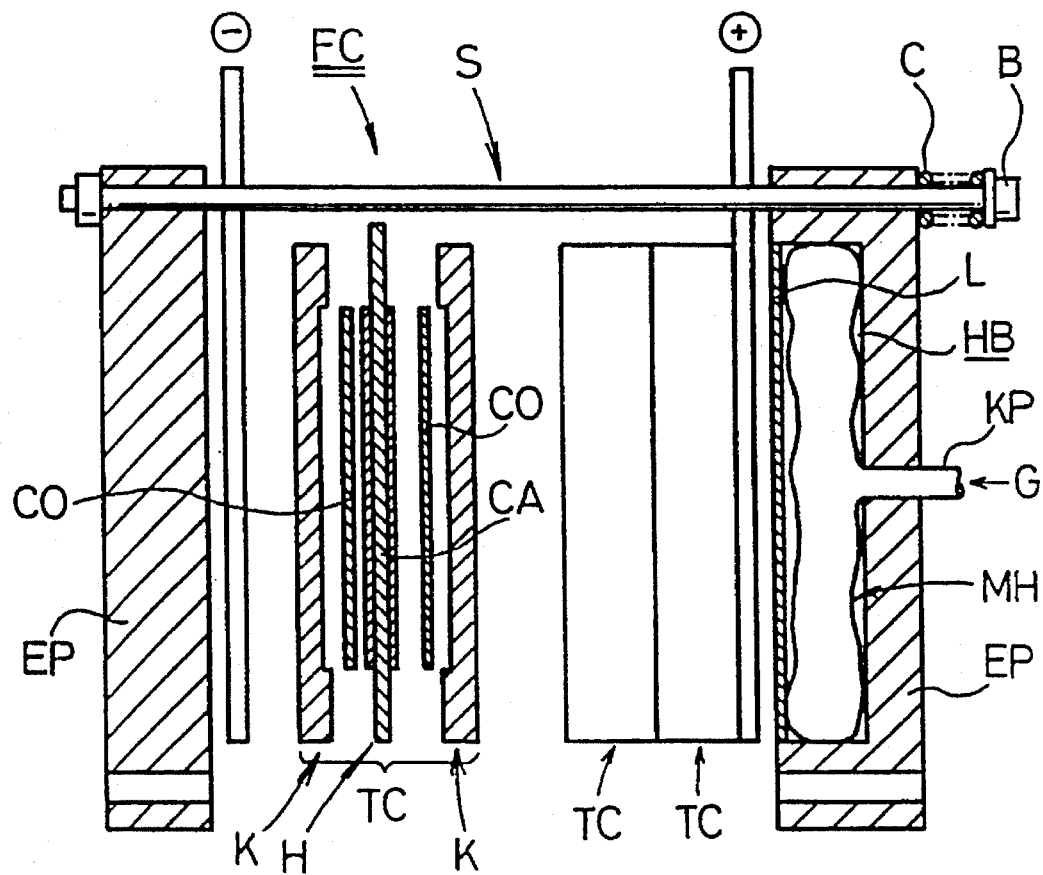
FIG. 1 is a vertical cross-sectional view showing the structure for squeezing the unit cells of a conventional internal manifold type fuel cell stack.
Figure 2:
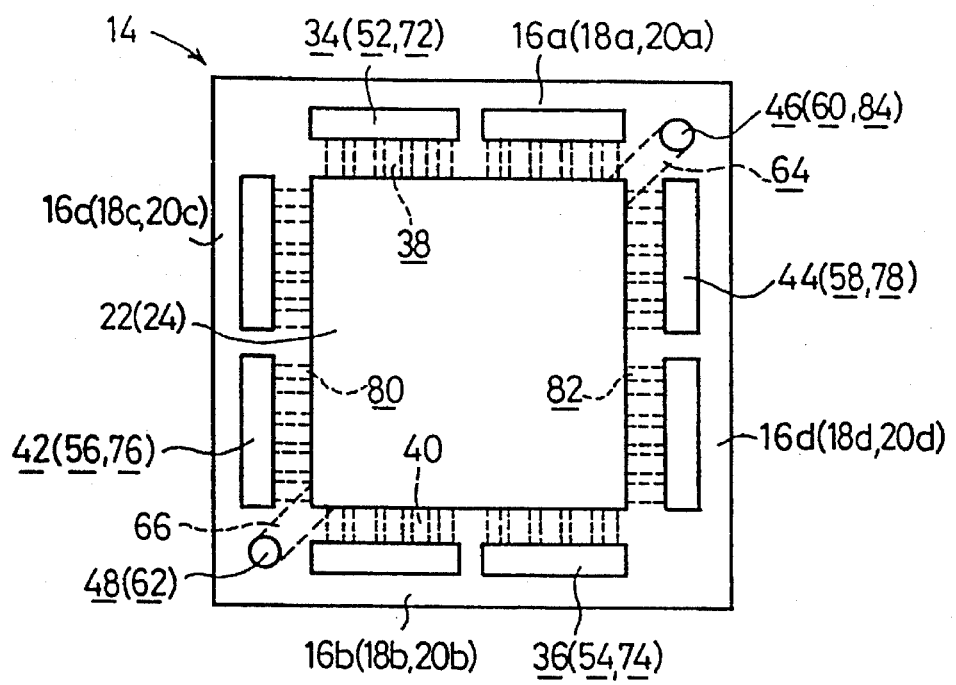
FIG. 2 is a plan view showing through-holes, communication holes, pores and small holes respectively formed in first, second and third plates which constitute a separator in a fuel cell stack as an embodiment of the present invention.

A description will further be made of the third plate 20. A large opening or hole 70 similar to the large holes 32 and 50 of the first and second plates 16 and 18 is centrally defined in the third plate 20. Through-holes 72 each shaped in the form of a rectangle and through-holes 74 similar to the through-holes 72 are respectively defined in upper and lower frames 20a and 20b of the third plate 20 so as to surround the large hole 70. Through-holes 76 are defined in a side frame 20c of the third plate 20 and through-holes 78 are defined in a side frame 20d thereof. In the third plate 20, the large hole 70 and the through-holes 76 communicate with one another through a plurality of pores 80. Similarly, the large hole 70 and the through-holes 78 communicate with one another through a plurality of pores 82. The pores 80 and 82 in the third plate 20 are oriented in a direction at 90° to the direction of pores 38 and 40 in the first plate 16, as illustrated in FIGS. 2, 3 and 4. A communication hole 84 is defined in the corner formed by the upper frame 20a and the side frame 20d of the third plate 20. An unillustrated communication hole is defined in the corner formed by the lower frame 20b and the side frame 20c at the position corresponding to each of the communication hole 48 of the first plate 16 and the communication hole 62 of the second plate 18.

Figure 5:
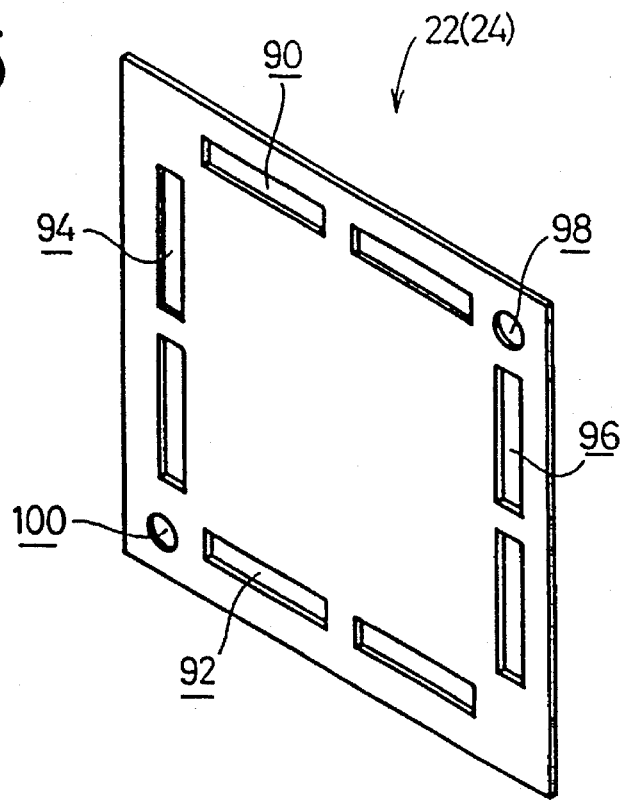
FIG. 5 is a perspective view depicting a bearing pressure generating plate of the fuel cell stack shown in FIG. 3.

The first and second pressure generating plates 22 and 24 will now be described with reference to FIG. 5. Each of the first and second pressure generating plates 22 and 24 is made of stainless steel. As shown in FIG. 5, each of the first and second pressure generating plates 22 and 24 has through-holes 90, 92, 94 and 96 associated with the through-holes respectively defined in the upper, lower and side frames of the first, second and third plates 16, 18 and 20. Further, a communication hole 98 is defined in one of the corners of each of the first and second pressure generating plates 22 and 24 so as to correspond to each of the communication holes 46, 60 and 84. Moreover, a communication hole 100 is defined in the corner diagonally opposite to said one corner so as to correspond to each of the communication holes 48 and 62 and the unillustrated communication hole defined in the corner formed by the side frame 20c and the lower frame 20b of the third plate 20.

When the first plate 16, the first pressure generating plate 22, the second plate 18, the second pressure generating plate 24 and the third plate 20, all constructed as described above, are stacked on one another so as to be formed, as the separator 14, a pressure chamber 104 (see FIG. 3), which serves as a cooling chamber is defined between the first pressure generating plate 22 and the second pressure generating plate 24.

Referring again to FIGS. 3 and 4, the cell unit 12 will next be described below.

The cell unit 12 basically comprises a pair of collectors 110 and 112, and a membrane-electrode assembly 124 interposed between the collectors 110 and 112. Each of the collectors 110 and 112 is made of carbon as a rigid body.

The collector 110 is made of a plate shaped substantially in the form of a square and substantially identical in thickness to the first plate 16, which is fitted in the large hole 32 of the first plate 16 of the separator 14 with a slight gap formed therebetween.

As shown in FIG. 4, the collector 110 has a plurality of grooves 114 which are formed therein to communicate with the pores 38 and 40 of the first plate 16 and enlarge the surface area of the collector 110 in order for the porous carbon material to more readily absorb the reaction gas. Thus, when the collector 110 is fitted in the large hole 32 of the first plate 16, the grooves 114 communicate with the through-holes 34 and 36 through the pores 38 and 40 respectively. When the collector 110 is pressed by the first pressure generating plate 22, it can be displaced within the large hole 32 of the first plate 16 in the direction perpendicular to the direction in which the grooves 114 extend.

The collector 112 is made of a plate which is shaped substantially in the form of a square corresponding to the large hole 70 of the third plate 20 and which is substantially identical in thickness to the third plate 20. A plurality of grooves 116, which communicate with the pores 80 and 82 formed in the third plate 20, are defined in the collector 112. Thus, when the collector 112 is fitted in the large hole 70 of the third plate 20, the grooves 116 communicate with the through-holes 76 and 78 through the pores 80 and 82 respectively. When the collector 112 is pressed by the second pressure generating plate 24, it can be displaced within the large hole 70 of the third plate 20 in the direction perpendicular to the direction in which the grooves 116 extend.

The membrane-electrode assembly 124 has electrode catalyst layers 128a and 128b formed on both surfaces of a solid polymer electrolyte membrane 126. The solid polymer electrolyte membrane 126 is substantially identical in side to the inner edges of the through-holes 34, 36, 42 and 44. On the other hand, the electrode catalyst layers 128a and 128b are substantially identical in size to the collectors 110 and 112.

Figure 6:
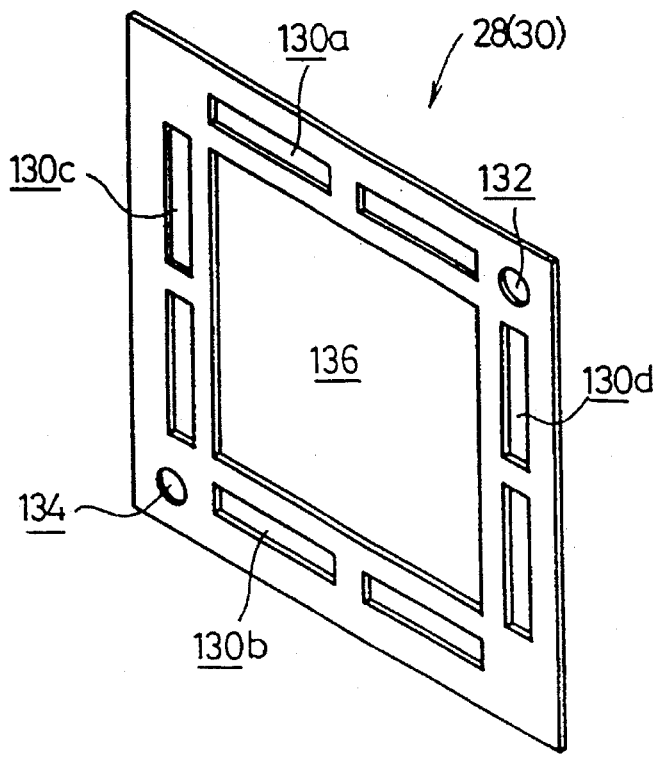
FIG. 6 is a perspective view showing a gasket of the fuel cell stack shown in FIG. 3.

FIG. 6 shows the structure of each of the gaskets 28 and 30. As shown in FIG. 3, the gaskets 28 an 30 are interposed between the first plate 16 and the third plate 20. The membrane-electrode assembly 124 is interposed between the gaskets 28 and 30. As will be described later, each of the gaskets 28 and 30 has through-holes 130a through 130d, communication holes 132 and 134 and a large opening or hole 136 defined therein in such a manner that a pressurized fluid is caused to flow between the first plate 16 and the third plate 20 and the collectors 110 and 112 are brought into contact with the membrane-electrode assembly 124.

Figure 7:
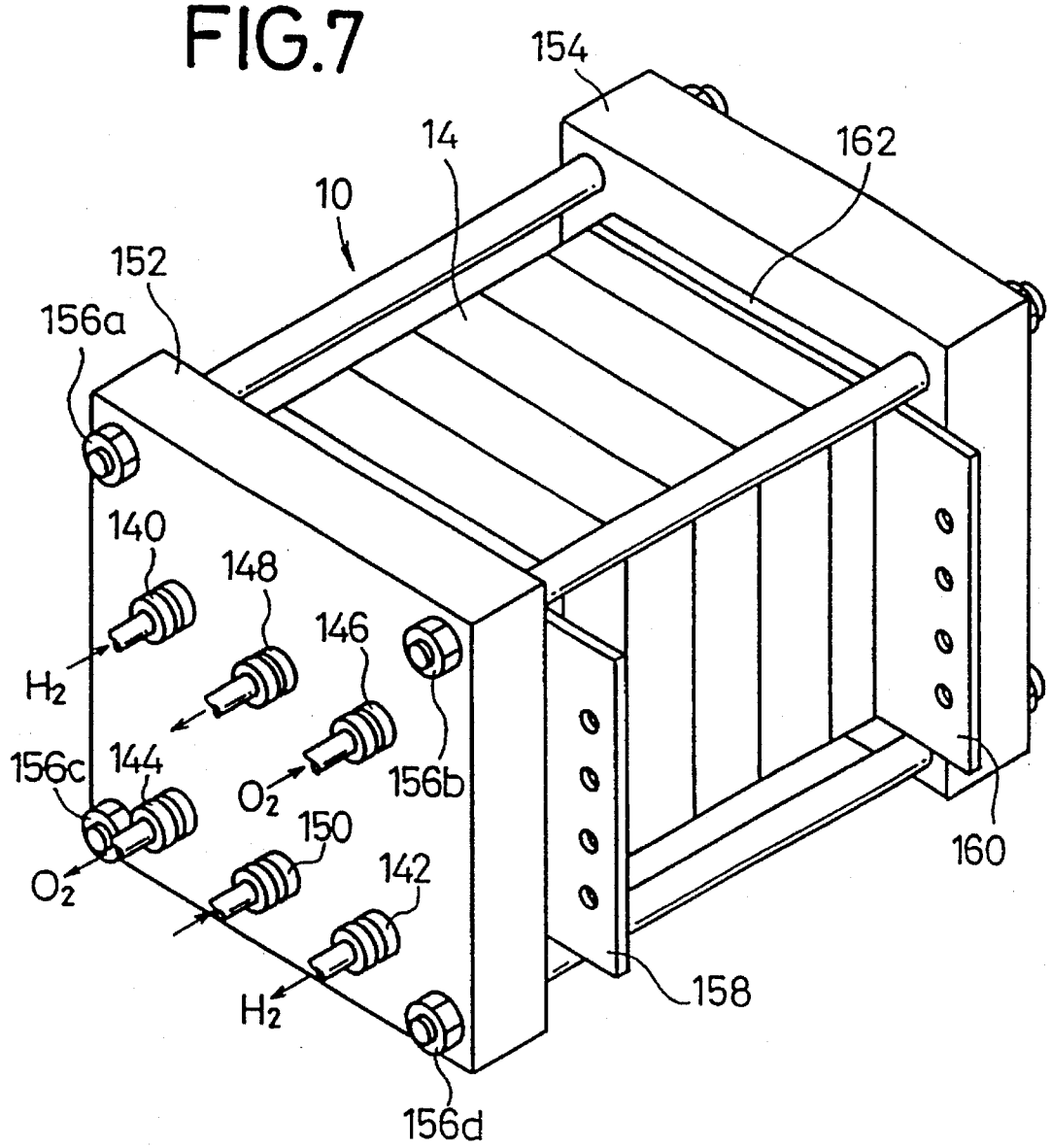
FIG. 7 is a perspective view illustrating the manner of pressing together the unit cells and separators of the fuel cell stack shown in FIG. 3.

In the cell units 12 and the separators 14 constructed as described above, each of the collectors 110 is displaceably fitted in the large hole 32 of the first plate 16 and each of the collectors 112 is displaceably fitted in the large hole 70 of the third plate 20. The smooth surfaces of the first and second collectors 110 and 112 are brought into contact with their corresponding electrode catalysts 128a and 128b. Further, a part of the membrane-electrode assembly 124, which is not covered by the electrode catalysts 128a and 128b, is held in contact with the gaskets 28 and 30. Thus, all of the gaskets 28, the first plates 16, the first pressure generating plates 22, the second plates 18, the second pressure generating plates 24, the third plates 20, the gaskets 30, and the membrane-electrode assemblies 124 are stacked on one another in that order to form the whole fuel cell stack 10. When these components are stacked and fixed, end plates 152 and 154 are attached to both ends of the fuel cell stack 10 as shown in FIG. 7. The end plate 152 has pipe fittings 140, 142, 144 and 146 which respectively communicate with the through-holes 34, 36, 42 and 44 of the first plate 16, and pipe fittings 148 and 150 which respectively communicate with the communication holes 46 and 48. The end plate 154 has no lines connected thereto. Further, the four corners of each of the end plates 152 and 154 are firmly and uniformly pressed together by bolts 156a through 156d respectively. Incidentally, a terminal plate 158 for taking out voltage and an insulating plate are interposed between the end plate 152 and the separator 14 adjacent to the end plate 152. Further, a terminal plate 160 and an insulating plate 162 are interposed between the end plate 154 and the separator 14 adjacent to the end plate 154.

Figure 8:
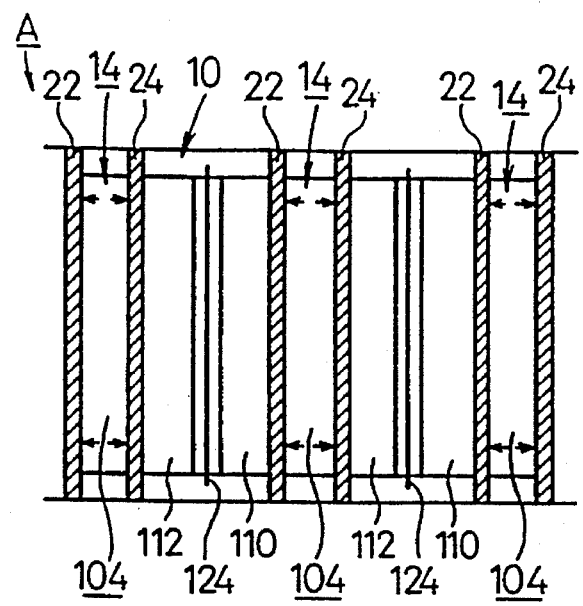
FIG. 8 is a vertical cross-sectional view showing a part of the fuel cell stack shown in FIG. 3.

Thus, when a fuel cell A (see FIG. 8) under the above construction is shut down, the pressure generating plates 22 and 24 (see FIG. 3) of each separator 14 maintain the same relationship as they have been assembled with respect to the collectors 110 and 112 provided adjacent to both sides of the pressure generating plates 22 and 24. When, on the other hand, the fuel cell A is started up, the pressurized fluid reaches the communication hole 62 through the pipe fitting 150 (see FIG. 7) of the end plate 152. The pressurized fluid flows into the pressure chamber 104 via the hole 66 (see FIG. 2), so that the internal pressure of the pressure chamber 104 is raised. Accordingly, the pressure generating plates 22 and 24 produce forces which expand toward both sides thereof so as to press the collectors 110 and 112 respectively. As a result, the membrane-electrode assembly 124 is held under uniform pressure by the collectors 110 and 112 each formed as a rigid body (made of sintered material) and hence the pressure for squeezing the fuel cell stack increases. Thus, the collectors 110 and 112 are held extremely closely to the membrane-electrode assembly 124, so that the contact resistance between each of the respective collectors 110, 112 and the membrane-electrode assembly 124 is reduced.

When the pressurized fluid is stopped from flowing into each pressure chamber 104 after the operation of the fuel cell A has been finished, the pressurized fluid in each pressure chamber 104 passes through the hole 64 and the through-hole 60 and is then discharged to the outside from the pipe fitting 148 of the end plate 152. As a result, the internal pressure in each pressure chamber 104 is reduced. Accordingly, the pressure transferred to the collectors 110 and 112 by the pressure generating plates 22 and 24 is also reduced so as to return to the pressure under which the fuel cell stack 10 has been assembled.

Next, several embodiments each descriptive of a method of pressing together a fuel cell stack will be described below. Incidentally, fluid passages of pressurized fluid necessary for pressing together the fuel cell stack are described in these embodiments, however, description and illustration are omitted here of the fuel lines for activating the fuel cells, which are provided in a fuel cell system as a matter of course.

A first embodiment according to the present invention wherein a liquid coolant is used as the pressurized fluid employed in the present invention, will first be described with reference to FIGS. 9 and 10.

Figure 9:
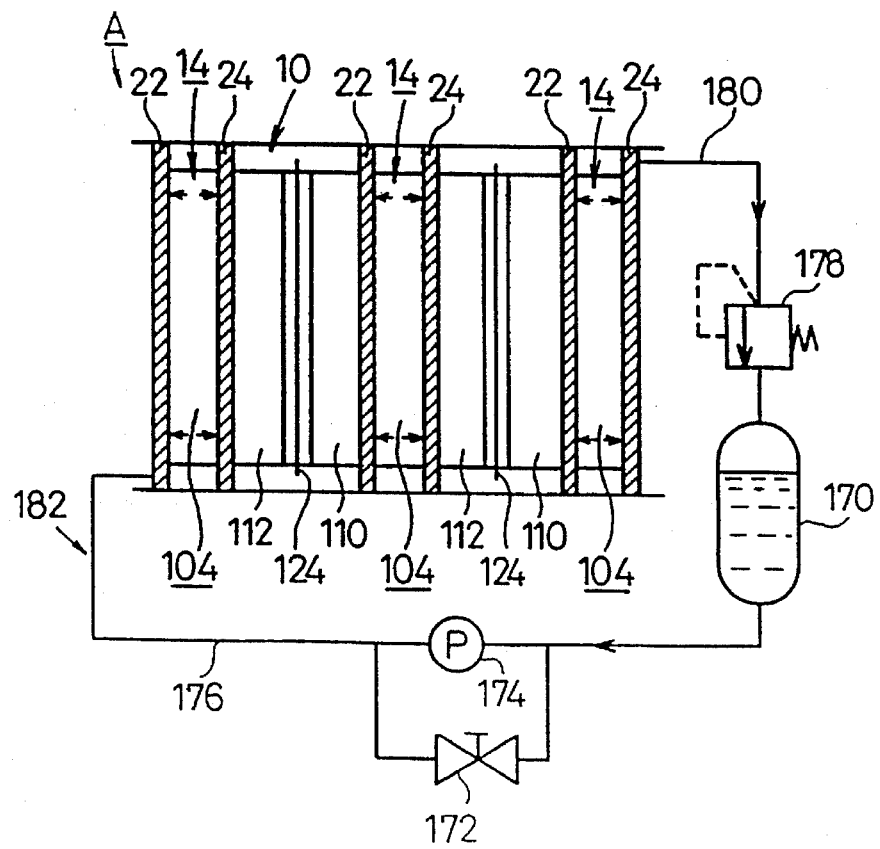
FIG. 9 is a schematic system diagram showing a coolant circulating circuit employed in a first embodiment illustrative of a fuel cell stack compressing method according to the present invention.

As shown in FIG. 9, in a system for effecting the first embodiment, a circuit 182 comprises a supply pipe 176 and a circulating line 180. The supply pipe 176 extends from a tank 170 for storing either water or methanol as the coolant therein, through a booster pump 174 having a bypass valve 172, to a pipe fitting 150 on an end plate 152 to which the pressurized fluid is introduced. The circulating line 180 extends from a pipe fitting 148 on an end plate 152 from which the pressurized fluid is discharged, through a back-pressure valve 178, to the tank 170.

The booster pump 174 increases pressure of the coolant and supplies the coolant to the fuel cell stack 10. Thus, the pressure in the pressure chamber 104 of each separator 4 is raised to produce pressure to press together the unit cells and separators of the fuel cell stack. Variations of this pressure and the contact resistance with respect to time are respectively illustrated by graphs shown in FIG. 10. At a point a, the fuel cell A is started up (the bypass valve 172 is closed and the booster pump 174 is started-up), and at a point b the fuel cell A is shut down (the booster pump 174 is stopped and the bypass valve 172 is opened). During a period in which the fuel cell A is started up, the action for cooling the fuel cell A is thus effected by supplying the increased pressure of coolant to each pressure chamber 104 and the membrane-electrode assembly 124 is held under the uniform pressure by the collectors 110 and 112 so as to reduce the contact resistance. Thus, if the collectors 110 and 112 are brought into close contact with the membrane-electrode assembly 124 by pressure, then the contact resistance can be reduced as described above and a high voltage can be outputted from the fuel cell A.

A second embodiment according to the present invention wherein a liquid coolant is used as the pressurized fluid employed in the present invention, will next be described with reference to FIGS. 11 and 12.

Figure 11:
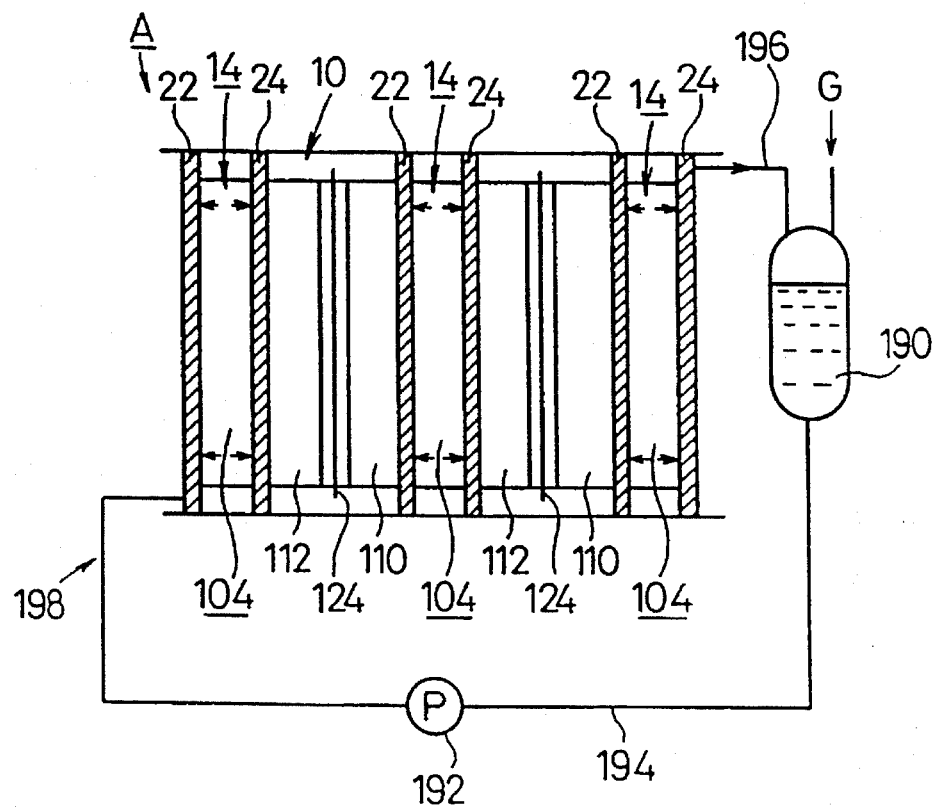
FIG. 11 is a schematic system diagram showing a coolant circulating circuit employed in a second embodiment illustrative of a fuel cell stack compressing method according to the present invention.
Figure 12:
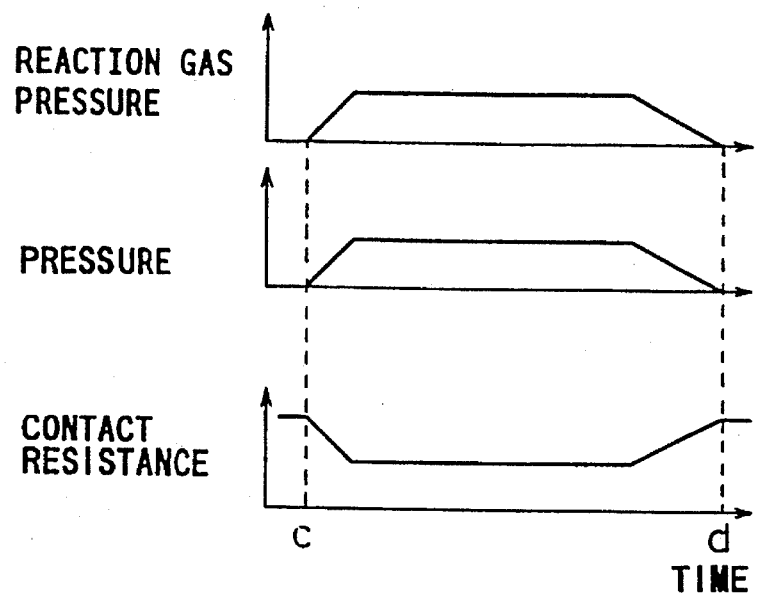
FIG. 12 is a graph showing the mutual relationship among the pressure of a reaction gas, the pressure pressing together the fuel cell stack, the contact resistance and the time.

As shown in FIG. 11, in a system for effecting the second embodiment, a circuit 198 comprises a supply pipe 194 and a circulating line 196. The supply pipe 194 extends from a tank 190 for storing either water or methanol as the coolant therein, through a circulating pump 192, to a pipe fitting 150 on an end plate 152 of a fuel cell stack 10 to which the pressurized fluid is introduced. The circulating line 196 extends from a pipe fitting 148 on the end plate 152 from which the pressurized fluid is discharged, to the tank 190. A reaction gas G for applying the pressure to the coolant is introduced into an upper portion of the tank 190.

The pressurized coolant is then supplied to the fuel cell stack 10 by the circulating pump 192 so as to increase the pressure in the pressure chamber 104 of each separator 14. As a result, the pressure that presses together the unit cells and separators of the fuel cell stack is generated. Variations of the pressure of the reaction gas, the pressure pressing together the unit cells and the separators, and the contact resistance with respect to time are respectively illustrated by graphs shown in FIG. 12. At a point c, the fuel cell A is started up, i.e., the pressure of the reaction gas is raised and the pump 192 is started, and at a point d, the fuel cell A is made inactive, i.e., the pressure of the reaction gas is reduced and the pump 192 is stopped.

A third embodiment according to the present invention wherein a liquid coolant is used as the pressurized fluid employed in the present invention, will now be described with reference to FIG. 13 and FIGS. 14A through 14D.

Figure 13:
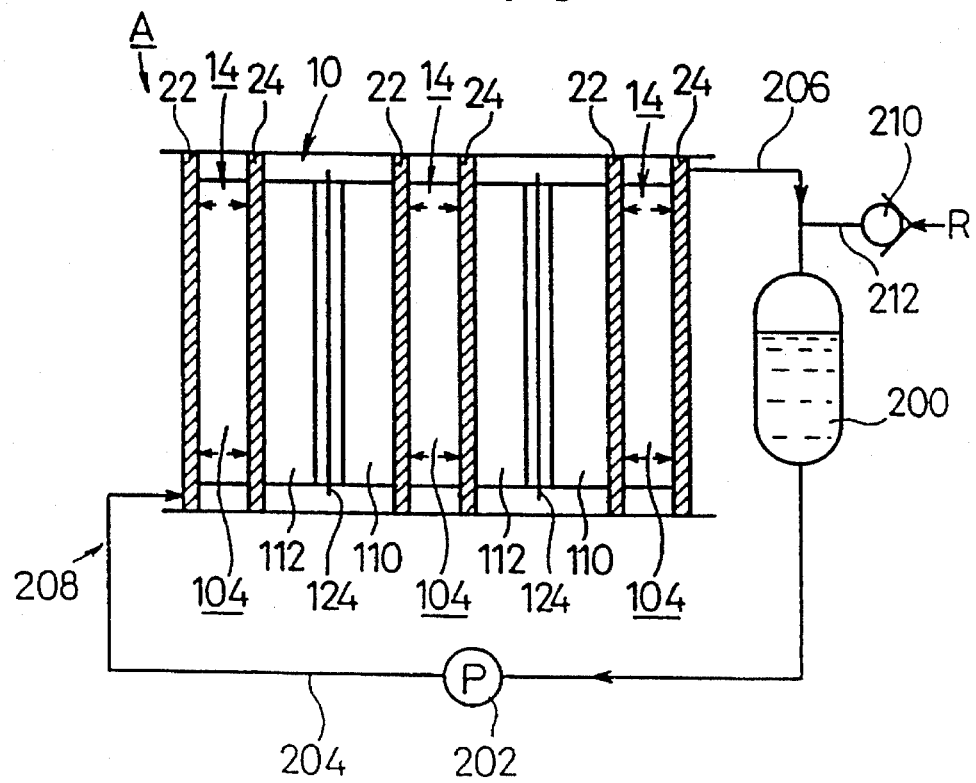
FIG. 13 is a schematic system diagram showing a coolant circulating circuit employed in a third embodiment illustrative of a fuel cell stack compressing method according to the present invention.
Figure 14A:
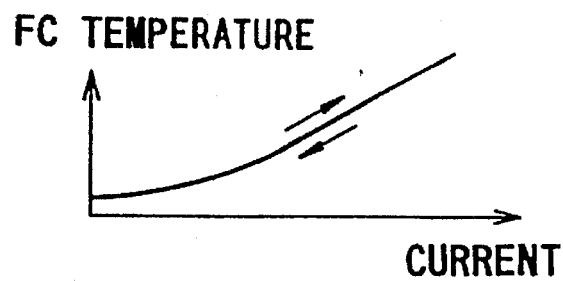
FIG. 14A is a view illustrating the relationship between the temperature of a fuel cell and the current at the time of coolant circulation in the third embodiment shown in FIG. 13.
Figure 14B:
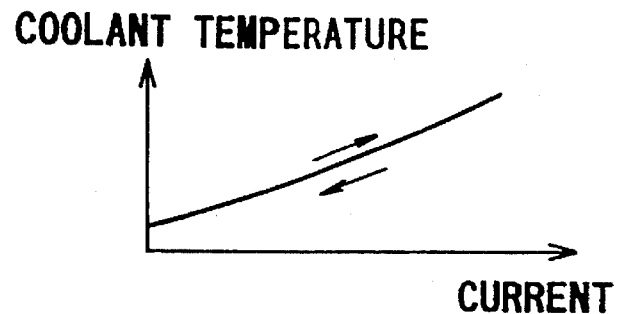
FIG. 14B is a view showing the relationship between the temperature of a coolant and the current at the time of the coolant circulation in the third embodiment shown in FIG. 13.
Figure 14C:
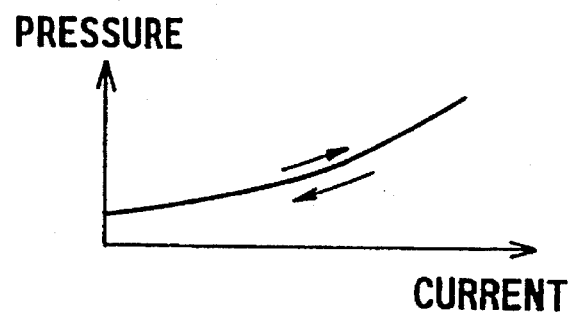
FIG. 14C is a view showing the relationship between the pressure pressing together the fuel cell stack and the current at the time of the coolant circulation in the third embodiment shown in FIG. 13.
Figure 14D:
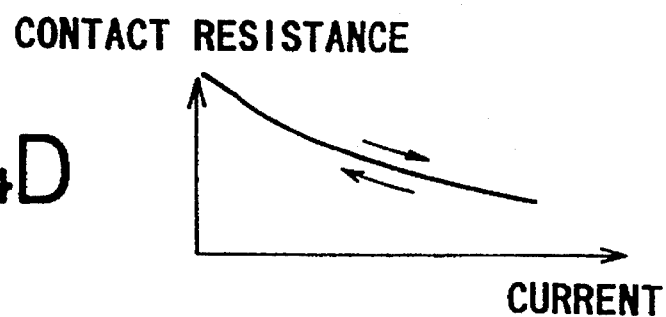
FIG. 14D is a view illustrating the relationship between the contact resistance and the current at the time of the coolant circulation in the third embodiment shown in FIG. 13.

As shown in FIG. 13, in a system for effecting the third embodiment, a circuit 208 comprises a supply pipe 204 and a circulating line 206. The supply pipe 204 extends from a tank 200 for storing either a solvent having a low boiling point or methanol as the coolant therein, through a circulating pump 202, to a pipe fitting 150 on an end plate 152 of a fuel cell stack 10 to which the pressurized fluid is introduced. The circulating line 206 extends from a pipe fitting 148 on the end plate 152 from which the pressurized fluid is discharge, to the tank 200. A coolant replenishing line 212 having a check valve 210 meets with the circulating line 206 in the course thereof.

Thus, when the coolant is fed into and circulated in the fuel cell stack 10 by the circulating pump 202, the relationships between the electrical current to be produced and respective items comprising temperature of the fuel cell A, temperature of the coolant, pressure that presses together the unit cells and separators of the fuel cell stack, and contact resistance are represented as shown in FIGS. 14A through 14D. That is, when it is desired to increase the current to be produced, the temperature of the fuel cell A has to be raised and the temperature of the coolant in each separator increases. As a result, vapor pressure of the coolant is raised so as to increase the pressure pressing together the unit cells and the separators, thus reducing the contact resistance.

Figure 15:
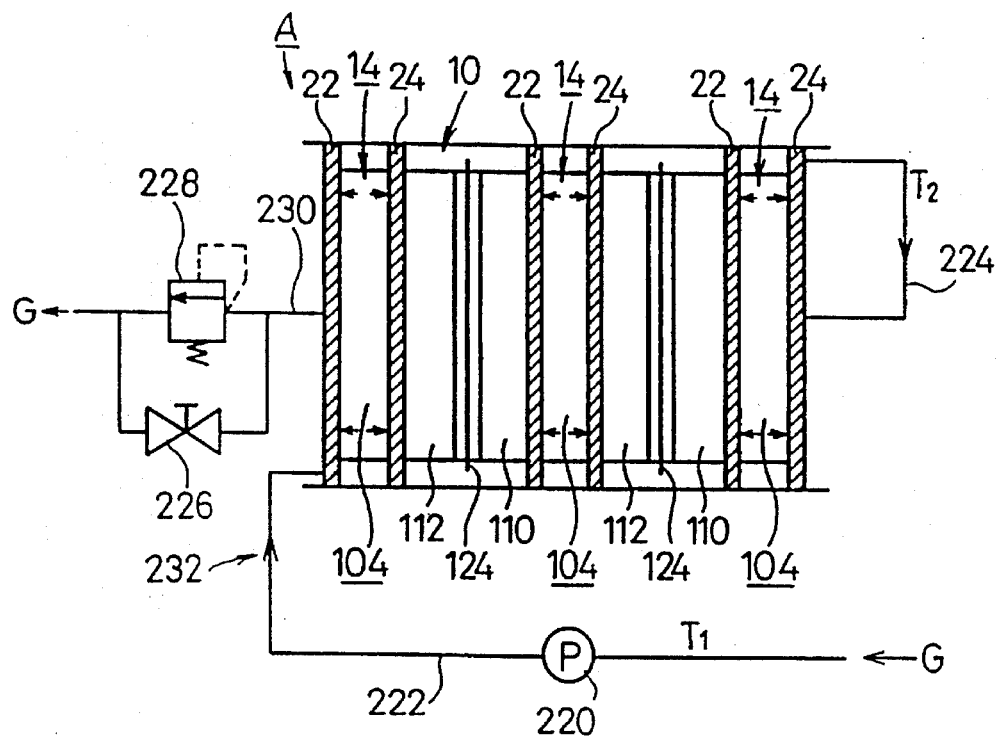
FIG. 15 is a schematic system diagram showing a coolant circulating circuit employed in a fourth embodiment illustrative of a fuel cell stack compressing method according to the present invention.

A fourth embodiment according to the present invention wherein a liquid coolant is employed as the pressurized fluid employed in the present invention, will now be described with reference to FIG. 15.

In a system for effecting the fourth embodiment, a supply circuit 232 comprises a supply pipe 222, a booster pump 220, a relay line 224, and a circulating line 230. The supply pipe 222 supplies either a fuel gas or an oxidant gas as a reaction gas G from an unillustrated tank to a coolant introduction hole, such as at pipe fitting 150, on the pressurized fluid introduction side of a fuel cell stack 10 through the booster pump 220. The relay line 224 connects one of the communication holes, such as pipe fitting 148, for introducing the pressurized fluid in the fuel cell stack 10 with one of through-holes, such as by pipe fitting 140 or 146, for supplying a reaction gas to respective unit cells, on the exterior of the fuel cell stack 10. The circulating line 230 extends from a through-hole, such as by pipe fitting 142 or 144, on the pressurized fluid discharge side and returns to an exhaust or the above tank, through a back-pressure valve 228 having a bypass valve 226.

Thus, the coolant whose pressure has been forcibly boosted by the booster pump 220, is fed into the fuel cell stack 10 to raise the pressure in the pressure chamber 104 of each separator 14, with the result that a fuel cell A is cooled simultaneously with the generation of the pressure that presses together the unit cells and separators of the fuel cell stack. Assuming now that the temperature of the supplied reaction gas is represented as $T_1$ and the temperature of the reaction gas in the relay line 224 after cooling the fuel cell is represented as $T_2$, $T_2$ is greater than $T_1$ (i.e., $T_2 > T_1$).

Figure 10:
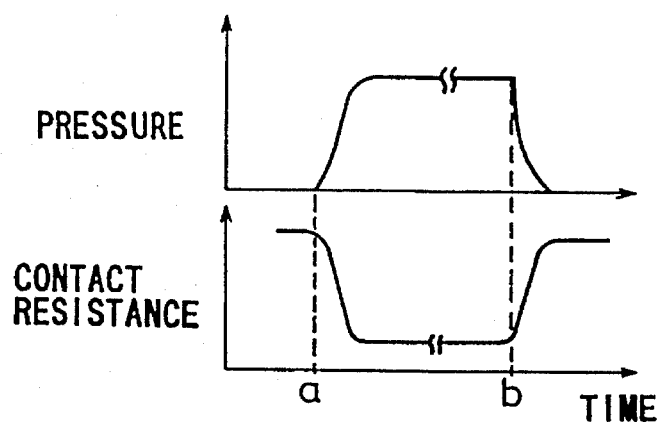
FIG. 10 is a graph illustrating the relationship between the pressure pressing together the fuel cell stack during coolant circulation, the contact resistance and the time.

Here, variations in the fastening pressure and the contact resistance with respect to time are identical to those shown by the graphs in FIG. 10, and their graphical representation is omitted.

Figure 16:
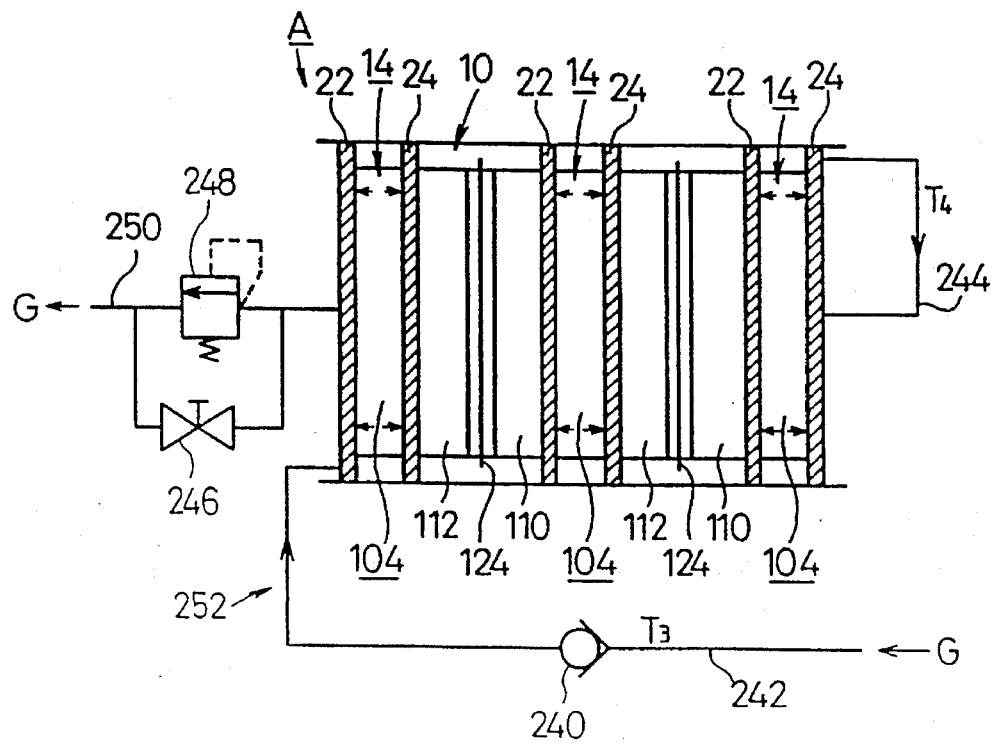
FIG. 16 is a schematic system diagram depicting a coolant circulating circuit employed in a fifth embodiment illustrative of a fuel cell stack compressing method according to the present invention.

A fifth embodiment according to the present invention wherein a gas coolant is used as the pressurized fluid employed in the present invention, will now be described with reference to FIG. 16.

In a system for effecting the fifth embodiment, a supply circuit 252 comprises a supply pipe 242, a relay line 244 and a circulating line 250, similar to the fourth embodiment. The supply pipe 242 supplies either a fuel gas or an oxidant gas as a high-pressure reaction gas from an unillustrated tank to a coolant introduction hole on the pressurized fluid introduction side of a fuel cell stack 10, through a check valve 240. The relay line 244 connects one of the communication holes for introducing the pressurized fluid in the fuel cell stack 10 with one of through-holes for supplying a reaction gas to respective unit cells, on the exterior of the fuel cell stack 10. The circulating line 250 extends from a through-hole on the pressurized fluid discharge side and returns to an exhaust or the above tank through a back-pressure valve 248 having a bypass valve 246.

Thus, the high-pressure reaction gas is fed into the fuel cell stack 10 through the check valve 240 from the supply line 242 to raise the pressure of the pressure chamber 104 of each separator 14, with the result that a fuel cell A is cooled simultaneously with the generation of the pressure that presses together the unit cells and separators of the fuel cell stack. Assuming now that the temperature of the fed high-pressure reaction gas is represented as $T_3$ and the temperature of the reaction gas in the relay line 244 after cooling the fuel cell is represented as $T_4$, $T_4$ is greater than $T_3$ (i.e., $T_4 > T_3$).

Here, variations in the pressure that presses together the unit cells and separators of the fuel cell stack and the contact resistance with respect to time are identical to those represented by graphs in FIG. 10, and their graphical representation is omitted.

A sixth embodiment according to the present invention wherein a gas coolant is used as the pressurized fluid employed in the present invention, will now be described with reference to FIGS. 17 and 18.

Figure 17:
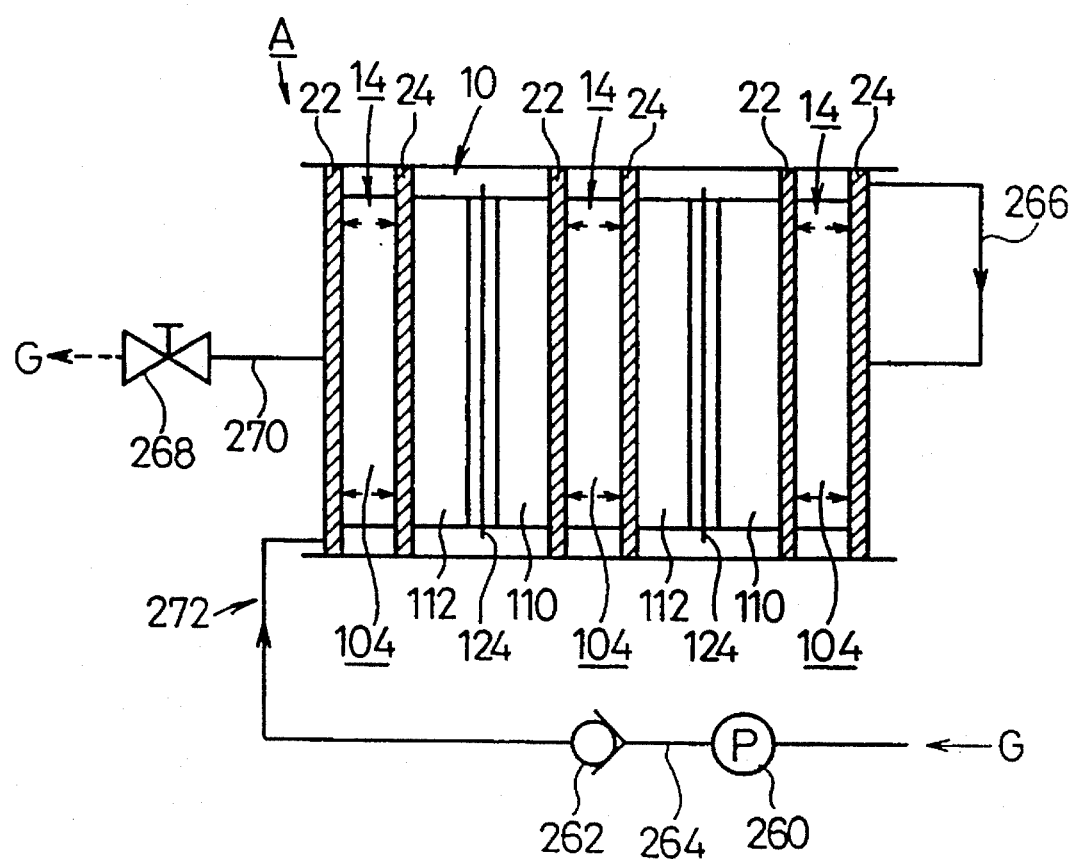
FIG. 17 is a schematic system diagram illustrating a coolant circulating circuit employed in a sixth embodiment illustrative of a fuel cell stack compressing method according to the present invention.

As shown in FIG. 17, in a system for effecting the sixth embodiment, a supply circuit 272 comprises a supply pipe 264, a relay line 266 and a circulating line 270, similar to the fourth and fifth embodiments. The supply pipe 264 supplies either a fuel gas as a reaction gas or an oxidant gas from an unillustrated tank to a coolant introduction hole on the pressurized fluid introduction side of a fuel cell stack 10, through a booster pump 260 and a check valve 262. The relay line 266 connects one of the communication holes for introducing the pressurized fluid in the fuel cell stack 10 with one of through-holes for supplying a reaction gas to respective unit cells, on the exterior of the fuel cell stack 10. The circulating line 270 extends from a through-hole on the pressurized fluid discharge side and returns to the above tank, through a throttle valve 268.

Thus, when the booster pump 260 is used to have the reaction gas pass through the check valve 262 through the supply line 264 so that the reaction gas is fed into the fuel cell stack 10, the reaction gas is retained in the fuel cell stack 10 by the check valve 262 and the throttle valve 268. Accordingly, the reaction gas cools the fuel cell A in response to the heat produced at the time of activation of the fuel cell A and is spontaneously raised in pressure simultaneously with its cooling. Therefore, the high-pressurized reaction gas increases the pressure of the pressure chamber 104 of each separator 14 so that the pressure to be generated by the pressure generating plates 22 and 24 is raised. Thus, the pressure that presses together the unit cells and separators of the fuel cell stack is produced.

Figure 18:
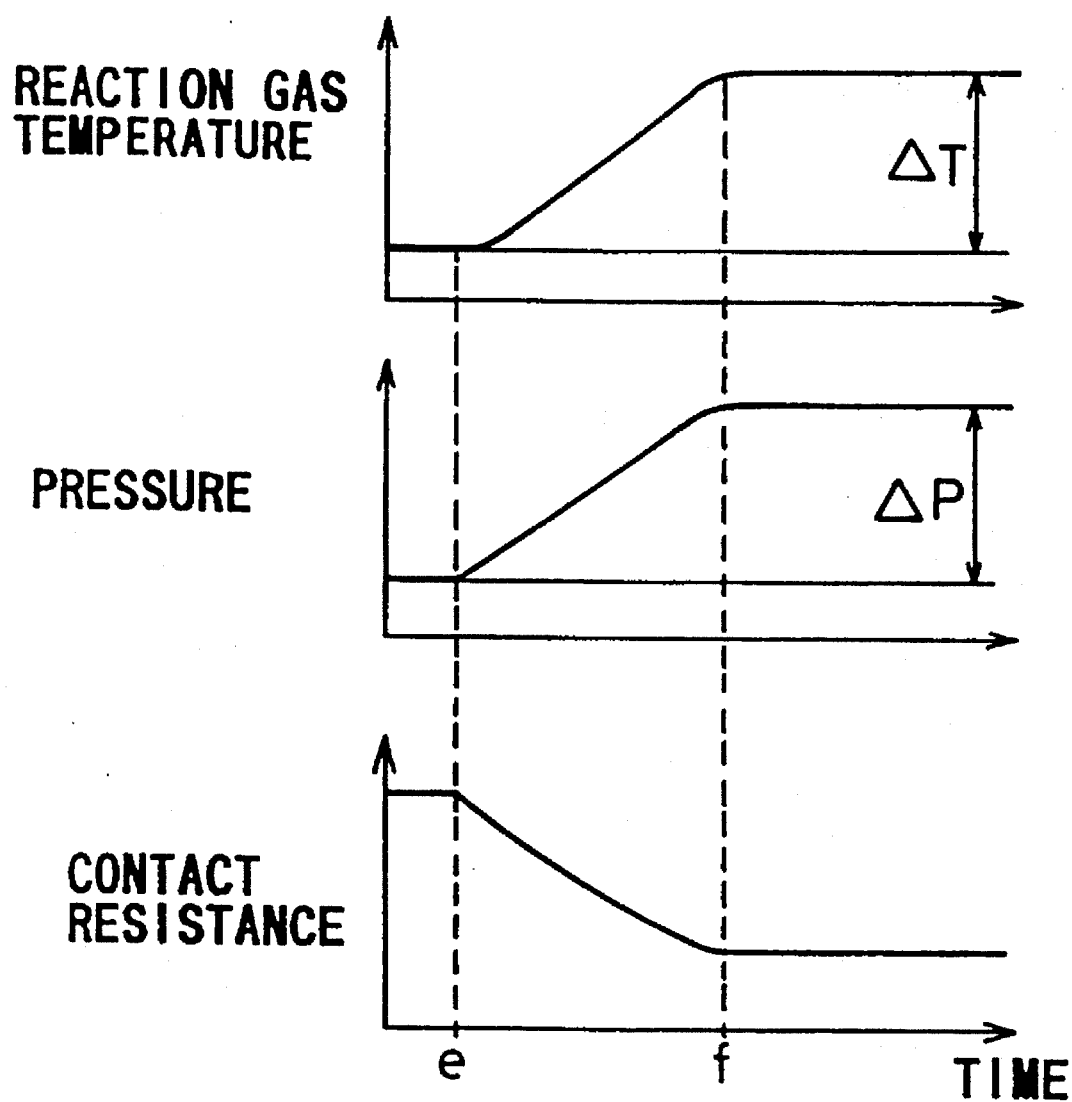
FIG. 18 is a graph showing the mutual relationship among the temperature of the reaction gas, the pressure, pressing together the fuel cell stack the contact resistance and the time at the time of the coolant circulation in the sixth embodiment shown in FIG. 17.

Here, the variations of temperature of the reaction gas, the pressure that presses together the unit cells and separators of the fuel cell stack and the contact resistance in each of the stacked unit cells with respect to time are represented by graphs shown in FIG. 18.

In the graphs shown in FIG. 18, a point e shows the time at which an increase in pressure of each pressure chamber 104 is started, and a point f shows the time at which the increase in pressure of each pressure chamber 104 is completed. $\Delta T$ and $\Delta P$ respectively show a difference in temperature of reaction gas and a difference in raised pressure.

Summing-up the embodiments referred to above, in the fuel cell stack and the method of pressing together the same according to the present invention, a pressurized fluid is introduced into a pressure chamber formed in each separator and the pressure is transferred to collectors, each made of a rigid body, from pressure generating plates which serve as the pressure transfer membranes. As a result, collectors are slightly displaced to be pressed against surfaces of the solid polymer electrolyte membrane. It is therefore unnecessary to maintain the high accuracy in the thickness of the collectors as in the conventional fuel cell stack. Since each of the collectors is a rigid body, the solid polymer electrolyte membrane is uniformly pressed by the collectors, and the contact resistance between the collectors and the solid polymer electrolyte membrane is reduced with an improvement in the efficiency of power generation.

Further, since each separator has a cooling function by using a coolant as the pressurized fluid, no temperature difference is developed between the unit cells in the fuel cell stack, thereby a stable operation of the fuel cell stack is enabled. The pressure for pressing together the fuel cell stack is raised due to an increase in the vapor pressure of the coolant. It is therefore unnecessary to separately provide separators each having a cooling function.

It is also unnecessary to additionally provide a pressure applying means if a high pressure fluid produced by the energy of heat at the time of reformation of a fuel or the energy of heat of a fuel cell, is used as a pressurized fluid.

Furthermore, since the normal squeezing of each cell unit in the fuel cell stack is unnecessary, elastic materials in respective constituent parts of unit cells bear less elastic fatigue. When the constituent members of the cell unit are released from contact with each other upon deactivation of the fuel cell, the electric corrosion between each separator and each of the electrode catalysts can also be prevented and a long life of the fuel cell stack can hence be expected.

When a liquid coolant is used as a pressurized fluid, the supply of the heat of vaporization of methanol at the time of reformation of methanol/steam and the reformation of a fuel in each separator can be effected. Further, the cold resistance can also be obtained.

When, on the other hand, a gas coolant is used as the pressurized fluid, a gas preheating function can be expected in each separator.

What is claimed is:

1. A fuel cell stack comprising a plurality of unit cells for taking out electrical energy from a reaction gas and a plurality of separators interposed between said unit cells, wherein each of said unit cells comprises a solid polymer electrolyte membrane having a pair of electrode catalysts attached on both surfaces thereof, and means of a rigid porous material provided in each said separator, respectively, for applying pressure to each of said electrode catalysts, and each of said separators includes plates defining a chamber therein into which a fluid is introduced, said rigid porous material means is displaceable by said chamber toward one of said electrode catalysts.

2. A fuel cell stack according to claim 1, wherein each of said separators comprises means for introducing the fluid into each of said chambers, and means for supplying the reaction gas to each of said unit cells through each of its collectors.

3. A fuel cell stack according to claim 1, wherein said means of rigid porous material comprises a collector, each said collector being made of a rigid body having a flat contact surface facing said electrode catalyst.

4. A fuel cell stack according to claim 3, wherein each of said separators has receiving means into which a pair of said collectors of rigid porous material are displaceably fitted.

5. A fuel call stack according to claim 4, wherein said receiving means are a pair of recesses defined on both sides of each of said separators, each of which recesses comprises a part of said chamber.

6. A fuel cell stack according to claim 5, further comprising end plates for pressing together the entirety of said fuel cell stack.

7. A fuel cell stack according to claim 6, wherein said fluid introducing means comprises communication holes formed in the peripheries of said separators in their stacked state and connected to a fluid supply line at one of said end plates, and holes for coupling said communication holes with each of said chambers in respective said separators.

8. A fuel cell stack according to claim 6, wherein said reaction gas supplying means comprises through-holes formed in the peripheries of said separators in their stacked state and connected to respective reaction gas supply lines at one of said end plates, and a plurality of pores for coupling respective said through-holes with each of said receiving means in said separators into which said collectors are fitted.

9. A fuel cell stack according to claim 1, wherein said fluid is a coolant and said chambers also function as cooling chambers.

10. A fuel cell stack according to claim 9, wherein said coolant is in a gaseous state.

11. A fuel cell stack according to claim 1, wherein said fluid is a pressurized reaction gas.

12. A fuel cell stack according to claim 11, wherein said pressurized reaction gas is introduced into the chambers at a temperature lower than an operating temperature of the fuel cell stack and is supplied to the unit cells via the collectors after being warmed in said chambers.

13. A fuel cell stack according to claim 8, wherein said plates of said separator comprise first, second and third rigid plates, a first deformable plate positioned between said first and second rigid plates, a second deformable plate positioned between said second and third rigid plates, said chamber being defined within said second plate and between said first and second deformable plates.

14. A fuel cell stack according to claim 13, wherein each of said through-holes for supplying the reaction gas to the unit cells via respective means of porous material is formed through said respective first, second and third plates.

15. A fuel cell stack according to claim 14, wherein each of said through-holes for supplying the reaction gas to the unit cells via respective rigid porous material means is formed through said respective first and second deformable plates.

16. A fuel cell stack according to claim 15, wherein said recesses in each of the separators for displaceably receiving the rigid porous material means therein are formed in said respective first and third plates.

17. A fuel cell stack according to claim 16, wherein said plurality of pores for connecting the through-holes with the recess for receiving the rigid porous material means are formed in said respective first and third plates.

18. A fuel cell stack according to claim 17, wherein the direction in which said pores extend in the first plate and the direction in which said pores extend in the third plate intersect each other at about 90°.

19. A fuel cell stack according to claim 13, wherein communication holes for introducing said fluid into said chamber are formed in respective said first, second and third plates.

20. A fuel cell stack according to claim 17, wherein each of said rigid porous material means has a plurality of grooves for introducing the reaction gas into each porous material means.

21. A fuel cell stack according to claim 20, wherein said grooves on said rigid porous material means communicate with said pores in the first and third plates.

22. A fuel cell stack according to claim 21, wherein said grooves formed in one rigid porous material means which is fitted in the first plate and said grooves formed in the other rigid porous material means which is fitted in the third plate are at right angles to each other, each of the grooves being a linear groove.

23. A fuel cell stack according to claim 1, wherein gaskets are respectively interposed between the adjacent separators.

24. A fuel cell stack according to claim 23, wherein each of said gaskets has a hole for enabling the displacement of each rigid porous material means.

25. A fuel cell stack according to claim 23, wherein each of said gaskets has through-holes for enabling the reaction gas to pass therethrough, and communication holes for enabling the pressurized fluid to pass therethrough.

26. A method of pressing together a fuel cell stack which comprises a plurality of unit cells for taking out electrical energy from a reaction gas and separators interposed between respective unit cells, the method comprising the steps of:

introducing a pressurized fluid into a chamber formed in each of said separators;

transferring a pressure in each said chamber due to the fluid to means of a rigid porous material provided in each said separator and to the adjacent unit cells; and pressing an electrode catalyst disposed on a side of a solid polymer electrolyte membrane of the unit cell by said means of rigid porous material.

27. A method according to claim 26, wherein a coolant is introduced into said chamber formed in each separator to deform said deformable plates of the separator, and to cool the electrode catalysts and the solid polymer electrolyte membrane in the unit cells.

28. A method according to claim 26, wherein a pressurized reaction gas is introduced into the pressure chamber defined in each of said separators to deform said deformable plates, thereby to produce a pressure for causing said porous material means to press together the plurality of unit cells.

* * * * *